United States Patent Office 3,745,171
Patented July 10, 1973

3,745,171
1-(PENTYL OR HEXYL)-3-ALKYL-3-(m-HYDROXYPHENYL)-PYRROLIDINES
Ian Moyle Lockhart, Egham, England, assignor to Parke, Davis & Company, Detroit, Mich.
No Drawing. Filed Oct. 12, 1970, Ser. No. 80,238
Claims priority, application Great Britain, July 24, 1970, 36,126/70
Int. Cl. C07d 27/04
U.S. Cl. 260—326.5 M                    4 Claims

ABSTRACT OF THE DISCLOSURE m-(3-alkyl - 3 - pyrrolidinyl)phenol compounds substituted at the 1-position of the pyrrolidine ring by pentyl or hexyl; including racemic and optically active forms; and acid-addition salts and phenolate salts of the foregoing compounds. These compounds have pharmacological properties, especially as analgesic agents. They can be prepared by cleavage of the phenolic ethers. They can also be prepared by reduction of the 1-pentanoyl or 1-hexanoyl compounds, for example, by reaction with lithium aluminum hydride followed by hydrolysis of the product.

SUMMARY AND DETAILED DESCRIPTION

The present invention relates to new 1,3-dialkylpyrrolidine compounds. More particularly, the invention relates to new 1-(pentyl or hexyl)-3-alkyl-3-(m-hydroxyphenyl)pyrrolidine compounds of the formula

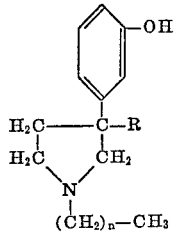

to salts thereof, and to methods for the production of the foregoing compounds; where R represents an alkyl radical containing from 3 to 5 carbon atoms inclusive; and $n$ represents 4 or 5. More specifically, R can represent such alkyl radicals as propyl, butyl, pentyl, isobutyl, neopentyl, and other alkyl radicals containing 3, 4, or 5 carbon atoms.

In accordance with the invention, the compounds of the foregoing formula and their salts, can be produced by reacting a compound of the formula

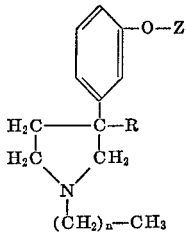

or a salt thereof with a reagent capable of cleaving the ether linkage; where R and $n$ are as defined before and Z represents a lower alkyl radical. The lower alkyl radicals represented by Z can optionally be substituted, in which case the nature of the substituent is relatively unimportant as the entire group is removed during the course of the reaction. A suitable reagent capable of cleaving the ether linkage is an acidic reagent. The treatment with an acidic reagent is followed, when necessary, by decomposition of an intermediate aluminum or boron complex which may be formed. Some examples of suitable acidic reagents are hydriodic acid, hydrobromic acid, hydrogen bromide in acetic acid, aluminum chloride in carbon disulfide, aluminum chloride in nitrobenzene, aluminum bromide in benzene, pyridine hydrochloride, and boron tribromide. The preferred acidic reagent is 48% (constant boiling) hydrobromic acid or boron tribromide. With hydrobromic acid, it is preferred to use a large excess of this reagent as a solvent. An additional solvent is not necessary and the reaction is commonly carried out for from one to 3 hours at the reflux temperature. In the case of other acidic reagents, the reaction conditions are modified as necessary. For example, in the case of boron tribromide, it is convenient to carry out the reaction in an unreactive solvent such as a hydrocarbon or a halogenated hydrocarbon for from 15 minutes to 12 hours at a temperature of approximately $-70$ to $+50°$ C. It is preferable to conduct the reaction at about $-60°$ C. while the reactants are being mixed and then allow the reaction mixture to warm to room temperature. The resulting product is formed as a boron complex which is then decomposed with a hydroxylic solvent such as methanol. In all of the above cases, the product can be isolated as an acid-addition salt, as the free base, or as a phenolate salt, following adjustment of the pH as required.

Starting materials required for use in the foregoing process can be prepared by any of a variety of methods. For example, a 3-alkyl-3-(m-lower alkoxyphenyl)pyrrolidine compound of the formula

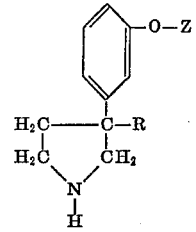

where R and Z are as defined before; is reacted with a pentyl halide such as pentyl bromide or a hexyl halide such as hexyl bromide under basic conditions in an unreactive solvent such as dimethylformamide. The product produced in this manner is a 1-(pentyl or hexyl)-3-alkyl-3-(m-lower alkoxyphenyl)pyrrolidine suitable as a starting material in the process described above.

Also in accordance with the invention, the compounds of the first formula herein and salts thereof, can be produced by reacting a compound of the formula

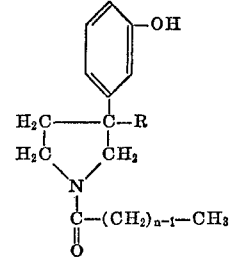

with a complex metal hydride reducing agent under anhydrous conditions, followed by hydrolyzing the product; where R and $n$ are as defined before. Some examples of suitable complex metal hydride reducing agents are lithium aluminum hydride and mixtures of lithium aluminum hydride and aluminum chloride. The preferred reducing agent is lithium aluminum hydride. Some examples of suitable solvents for the anhydrous stage of the process are ethers such as diethyl ether, tetrahydrofuran, dioxane, 1,2-dimethoxyethane, and diethylene glycol diethyl ether. The time and temperature of the reaction are not critical. In general, the reaction is carried out at from about 0 to 100° C. or at the reflux temperature of the reaction mixture for from less than one hour to about 24 hours. Using tetrahydrofuran as solvent, the reaction is substantially complete within 5 hours at the reflux temperature. While the reactants can be used in equivalent amounts, it is preferred to use a substantial excess of the complex metal hydride reducing agent. Following the anhydrous stage of the process, the reaction mixture is hydrolyzed with an aqueous medium such as water, a dilute aqueous acid, or a dilute aqueous base. The product can be isolated as an acid-addition salt, as the free base, or as a phenolate salt, following adjustment of the pH as required.

Starting materials required for use in the foregoing process can be prepared by any of a variety of methods. According to one such method, a 3-alkyl-3-(m-lower alkoxyphenyl)pyrrolidine of the formula

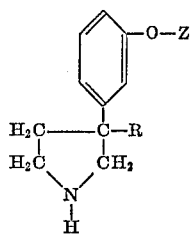

where R and Z are as defined before; is reacted with 48% hydrobromic acid at the reflux temperature to hydrolyze the ether group and the resulting 3-alkyl-3-(m-hydroxyphenyl)pyrrolidine is reacted with pentanoyl chloride or hexanoyl chloride in dimethylformamide solution in the presence of potassium carbonate to introduce the 1-pentanoyl or 1-hexanoyl group. According to another method, especially useful in the preparation of optically active starting materials and optically active final products, a 3-alkyl-3-(m-lower alkoxyphenyl)pyrrolidine of the formula indicated above is reacted with benzyl chloride in dimethylformamide solution in the presence of potassium carbonate in order to introduce a 1-benzyl group. The ether linkage is hydrolyzed by heating with 48% hydrobromic acid and the product neutralized. The resulting m-(1-benzyl-3-alkyl-3-pyrrolidinyl)phenol is converted to a salt with d-tartaric acid or other optically active acid and the diastereoisomeric salts are separated by fractional crystallization and converted by neutralization to the d- and l-enantiomorphs of m-(1-benzyl-3-alkyl-3-pyrrolidinyl)phenols. Each enanthiomorph is then hydrogenated in the presence of palladium-on-charcoal catalyst and hydrogen chloride in ethanol solvent in order to remove the 1-benzyl group. The resulting d- and l-enantiomorphs are then reacted with pentanoyl chloride or hexanoyl chloride in dimethylformamide solution in the presence of potassium carbonate as before, in order to introduce the 1-pentanoyl or 1-hexanoyl group.

The free bases of the invention form acid-addition salts with any of a variety of inorganic and organic acids. Pharmaceutically-acceptable acid - addition salts are formed by reaction with such acids as hydrochloric, hydrobromic, sulfuric, phosphoric, acetic, succinic, citric, maleic, and pamoic acids. The free bases (free phenols) of the invention also form phenolate salts with any of a variety of bases such as sodium hydroxide, potassium carbonate, and strongly-basic amines. The free bases and the salt forms are interconvertible by adjustment of the pH. They differ in solubility properties but in general are otherwise equivalent for the purposes of the invention. If desired, as illustrated in greater detail hereinafter, the compounds of the invention can also be obtained in optically active forms by using an optically active pyrrolidine derivative as starting material, or by resolving an optically inactive final product by fractional crystallization of a salt formed with an optically active acid.

The compounds of the invention are new chemical compounds useful as pharmacological agents and as chemical intermediates. They are of particular value as analgesic agents because they have the ability to relieve severe pain without producing side effects commonly associated with the use of alkaloidal analgesics. The analgesic activity of the compounds of the invention in either free base or salt form can be measured in standard assay procedures by administering a compound and observing the change in an animal's sensitivity to pain. One such procedure is described in Journal of Medicinal and Pharmaceutical Chemistry, 4, 1 (1961) and elsewhere. This assay procedure is performed in young rats and is based on measurement of the threshold mechanical pressures applied to the tails of rats required to elicit squeaking. An active analgesic agent raises the threshold tail pressure stimulus required for a squeak response. The compound is rated by administering graded doses of the test compound intraperitoneally and estimating the analgesic potency relative to a standard dose of codeine phosphate. It has previously been known that m-(1-methyl-3-propyl-3-pyrrolidinyl)phenol exhibits high activity in this test having an analgesic potency (relative to codeine=1.0) of 2.5. However, structurally similar compounds having a larger 1-alkyl group such as 1-propyl and 1-butyl have a much lower order of analgesic potency and in some cases are essentially inactive. Thus, it is surprising that in the 1-pentyl and 1-hexyl compounds of this invention, a high order of analgesic potency is found. Some preferred compounds of the invention in the assay procedure described above are m-(3-isobutyl-1-pentyl-3-pyrrolidinyl)phenol, m-(1-pentyl-3-propyl-3-pyrrolidinyl)phenol, and m-(3-neopentyl-1-pentyl-3-pyrrolidinyl)phenol. The analgesic potencies of these particular compounds (relative to codeine=1.0) have been determined as 2.5, 1.5, and 1.3 respectively. As indicated above, the compounds of the invention are active parenterally and they are also active on oral administration.

The invention is illustrated by the following examples.

EXAMPLE 1

A solution of 10.1 g. of 3-isobutyl-3-(m-methoxyphenyl)-1-pentylpyrrolidine in ether is treated with excess hydrogen chloride in ether. The resulting mixture is concentrated to dryness in vacuo and the residue, consisting of 3-isobutyl-3-(m-methoxyphenyl)-1-pentylpyrrolidine hydrochloride, is dissolved in 40 ml. of methylene chloride. The solution is cooled to −60° C. and 10 ml. of boron tribromide is added. It is then allowed to warm to room temperature, stirred at room temperature for 3 hours, cooled to −20° C., and treated cautiously with 50 ml. of methanol. The mixture is then concentrated to dryness and the residue stirred with 6 N aqueous ammonia and extracted with ether. The ether extract is washed with water, dried over anhydrous sodium sulfate, and concentrated to give a residue of m-(3-isobutyl-1-pentyl-3-pyrrolidinyl)phenol. For purification, the product is distilled in vacuo; B.P. 172° C. at 0.05 mm. A monocitrate salt, M.P. greater than 55° C., is obtained by adding a solution of the free base in ether to excess citric acid in ether. The hydrochloride salt is obtained by adding excess hydrogen chloride to a solution of the free base in ether. The sodium salt is obtained by adding 10 ml. of 1 N sodium hydroxide to a solution of 2.9 g. of the free base (free phenol) in ethanol and evaporating the mixture to dryness. The potassium salt is obtained by adding 10 ml. of 1 N potassium hydroxide to a solution of 2.9 g. of the free base (free phenol) in ethanol and evaporating the mixture to dryness.

By the foregoing general procedure, with the indicated substitutions of starting material, the following additional products are obtained.

From 3-(m-methoxyphenyl)-1-pentyl-3-propylpyrrolidine, the product is m-(1-pentyl-3-propyl-3-pyrrolidinyl)phenol; B.P. 158–160° C. at 0.3 mm.

From 1-hexyl-3-(m-methoxyphenyl)-3-propylpyrrolidine, the product is m-(1-hexyl-3-propyl-3-pyrrolidinyl)

phenol; B.P. 190° C. at 1 mm.; monocitrate salt softens about 50° C.

From 1 - hexyl-3-isobutyl-3-(m-methoxyphenyl)pyrrolidine, the produce is m-(1-hexyl-3-isobutyl-3-pyrrolidinyl)-phenol; B.P. 184° C. at 0.7 mm.; monocitrate salt softens above 55° C.

From 3 - (m - methoxyphenyl)-1-pentyl-3-neopentylpyrrolidine, the product is m-(3-neopentyl-1-pentyl-3-pyrrolidinyl)-phenol; B.P. 182–184° C. at 0.5 mm.; monocitrate salt softens above 50° C.

EXAMPLE 2

A solution of 18.0 g. of d-m-(3-isobutyl-1-pentanoyl-3-pyrrolidinyl)phenol and 200 ml. of tetrahydrofuran is added dropwise to a suspension of 6.0 g. of lithium aluminum hydride in 50 ml. of tetrahydrofuran. The mixture is heated and stirred at reflux for 5 hours, cooled, treated with 50 ml. of saturated ammonium chloride solution, and filtered. The filtrate is concentrated to dryness under reduced pressure and the residue dissolved in 150 ml. of chloroform. The chloroform solution is extracted with 2 N hydrochloric acid. The hydrochloric acid extract is made basic with 6 N aqueous ammonia and extracted with chloroform. This chloroform extract is washed with water, dried over anhydrous sodium sulfate, filtered, and the filtrate concentrated to dryness to give a residue of d-m-(3-isobutyl-1-pentyl-3-pyrrolidinyl)-phenol. For purification, the product is distilled in vacuo; B.P. 184–186° C. at 1 mm.; $[\alpha]_D^{24} +26.0°$ (0.970 g./100 ml. of ethanol).

A salt with one-half formula weight D(−)-tartaric acid, di-p-toluate ester, is obtained by adding 4.0 g. of the free base to a hot solution of 6.7 g. of D(−)-tartaric acid, di-p-toluate ester in 40 ml. of ethanol, diluting to a volume of 250 ml. with ethanol, heating the mixture to boiling, and filtering while hot. The product separates upon cooling the filtrate and is collected on a filter. It has decomposition point 191° C.; $[\alpha]_D^{26} +4.7°$ (0.467 g./100 ml. of dimethyl acetamide).

EXAMPLE 3

By following the general procedure of the preceding example, the product obtained from 1-m-(3-isobutyl-1-pentanoyl - 3 - pyrrolidinyl)phenol is 1-m-(3-isobutyl-1-pentyl-3-pyrrolidinyl)phenol; B.P. 192° C. at 2 mm.; $[\alpha]_D^{23} -26.6°$ (0.980 g./100 ml. of ethanol).

A salt with one formula weight D(−)-tartaric acid, di-p-toluate ester, is obtained by adding 4.0 g. of the free base to a hot solution of 6.7 g. of D(−)-tartaric acid, di-p-toluate ester in 40 ml. of ethanol, allowing the solution to cool, and collecting the product on a filter. It has decomposition point 147° C.; $[\alpha]_D^{23} -45.9°$ (0.493 g./100 ml. of dimethylacetamide).

STARTING MATERIALS

A mixture of 10 g. of 3-isobutyl-3-(m-methoxyphenyl)-pyrrolidine, 13 g. of anhydrous potassium carbonate, 7 g. of pentyl bromide, and 30 ml. of dimethylformamide is stirred at room temperature for 3 days. The insoluble solid material is removed by filtration and washed with absolute ethanol. The filtrate and washings are combined, concentrated to one-half their original volume, poured into water, and the resulting mixture extracted with benzene. The benzene extract is washed with water, dried over anhydrous sodium sulfate, and concentrated to dryness. The residue is distilled to give 3-isobutyl-3-(m-methoxyphenyl)-1-pentylpyrrolidine; B.P. 152–155° C. at 0.4 mm. In a similar manner, the following additional products are obtained. From 3-(m-methoxyphenyl)-3-propylpyrrolidine and pentyl bromide, the product is 3-(m-methoxyphenyl)-1-pentyl-3-propylpyrrolidine; B.P. 146–150° C. at 0.7 mm.; $n_D^{20}$ 1.5090. From 3 - (m-methoxyphenyl)-3-propylpyrrolidine and hexyl bromide, the product is 1-hexyl - 3 - (m-methoxyphenyl)-3-propylpyrrolidine; B.P. 170–174° C. at 1.4 mm.; $n_D^{17}$ 1.5090. From 3-isobutyl-3-(methoxyphenyl)pyrrolidine and hexyl bromide, the product is 1 - hexyl-3-isobutyl-3-(m-methoxyphenyl)-pyrrolidine; B.P. 164–166° C. at 0.6 mm.; $n_D^{18}$ 1.5067. From 3-(m-methoxyphenyl)-3-neopentylpyrrolidine and pentyl bromide, the product is 3-(m-methoxyphenyl)-1-pentyl-3-neopentylpyrrolidine; B.P. 155° C. at 0.4 mm.; $n_D^{19}$ 1.5100.

With stirring, 35 ml. of benzyl chloride is added dropwise to a mixture of 70.0 g. of 3-isobutyl-3-(m-methoxyphenyl)pyrrolidine, 41.5 g. of anhydrous potassium carbonate, and 120 ml. of dimethylformamide. The reaction mixture is heated at 50° C. for 4 hours, allowed to stand at room temperature overnight, and poured into 1,000 ml. of water. The aqueous mixture is extracted with ether and the ether extract is washed with water, dried over anhydrous magnesium sulfate, and concentrated to dryness under reduced pressure to give a residue of 1-benzyl - 3-isobutyl-3-(m-methoxyphenyl)-pyrrolidine. For purification, the product is distilled in vacuo; B.P. 178–180° C. at 0.7 mm.; $n_D^{21}$ 1.5515. A mixture of 71.5 g. of this product and 600 ml. of 48% hydrobromic acid is heated at reflux for 3 hours and cooled. The insoluble solid product is collected by removal of the liquid phase by decantation. This solid product is made basic with 500 ml. of 6 N aqueous ammonia and extracted with ether. The ether extract is washed with water, dried over anhydrous magnesium sulfate, and evaporated to give a residue of m-(1-benzyl-3-isobutyl-3-pyrrolidinyl)phenol. For purification, it is crystallized from hexane; M.P. 84–86° C.

A hot solution of 60.0 g. of d-tartaric acid and 300 ml. of absolute ethanol is treated with 61.4 g. of m-(1-benzyl-3 - isobutyl-3-pyrrolidinyl)phenol in 250 ml. of absolute ethanol. The mixture is held overnight in a refrigerator and then filtered to give a first crystalline product (56 g.) and a first filtrate. The first crystalline product is boiled with 1,000 ml. of absolute ethanol and filtered while hot to give a second crystalline product (30 g.); $[\alpha]_D^{25} +18.1°$; and a second filtrate. Upon cooling, the second filtrate deposits a third crystalline product (8.5 g.); $[\alpha]_D^{25} +29.3°$. Upon neutralization, the third crystalline product yields d-m-(1 - benzyl-3-isobutyl-3-pyrrolidinyl) phenol. The first filtrate (as identified above) is concentrated to dryness and the residue made basic with 6 N aqueous ammonia. The basic mixture is extracted with ether and the ether extract is dried over anhydrous magnesium sulfate and evaporated to give a residue of 1-m-(1-benzyl-3-isobutyl-3-pyrrolidinyl)-phenol. For purification, the product is crystallized from hexane; M.P. 106–108° C.; $[\alpha]_D^{25} -43.5°$ (0.967 g./100 ml. of ethanol).

A mixture of 15.4 g. of 1-m-(1-benzyl-3-isobutyl-3-pyrrolidinyl)phenol, 150 ml. of absolute ethanol, 10 ml. of 7 N hydrogen chloride in ethanol, and 400 mg. of 10% palladium-on-charcoal catalyst is shaken in contact with hydrogen at one atmosphere pressure at 55° C. for 2 hours or until absorption of hydrogen is substantially complete. The mixture is filtered to remove catalyst and the filtrate is concentrated under reduced pressure to give a residue of 1 - m-(3-isobutyl-3-pyrrolidinyl)phenol hydrochloride. For purification, the product is crystallized from isopropyl alcohol-ether; M.P. 182–183° C.; $[\alpha]_D^{24} -16.5°$ (0.990 g./100 ml. of ethanol). For conversion to the free base, the hydrochloride described above is treated with aqueous ammonia and extracted with ether. The product is 1-m-(3-isobutyl-3-pyrrolidinyl)phenol; M.P. 131–132° C. following crystallization from benzene-hexane; $[\alpha]_D^{24} +0.7°$ (0.957 g./100 ml. of ethanol). Similarly, d-m-(1-benzyl - 3-isobutyl-3-pyrrolidinyl)phenol is hydrogenated to d-m-(3 - isobutyl-3-pyrrolidinyl)phenol hydrochloride and the latter compound converted by basification with ammonia to give d-m-(3-isobutyl-3-pyrrolidinyl)phenol in free base form.

With stirring, 11.0 ml. of pentanoyl chloride is added to a mixture of 18.0 g. of d-m-(3-isobutyl-3-pyrrolidinyl) phenol, 15.0 g. of potassium carbonate, and 120 ml. of dimethylformamide at 70° C. The mixture is stirred an additional 4 hours at 80° C., cooled, and filtered. The filtrate is concentrated under reduced pressure and the residue stirred with 200 ml. of water and extracted with chloroform. The chloroform extract is washed with 2 N hydrochloric acid and with water, dried over anhydrous sodium sulfate, and concentrated in vacuo to give a residue of crude d-m-(3 - isobutyl-1-pentanoyl-3-pyrrolidinyl)phenol; $[\alpha]_D^{25}$ +80.4° (0.953 g./100 ml. of ethanol); suitable for use without further purification. Similarly, the product obtained from 1-m-(3-isobutyl-3-pyrrolidinyl)phenol is 1 - m-(3-isobutyl-1-pentanoyl-3-pyrrolidinyl)phenol; M.P. 136–137° C. following crystallization from acetone; $[\alpha]_D^{24}$ −94.5° (1.000 g./100 ml. of ethanol).

What is claimed is:
1. A member of the class consisting of compounds of the formula

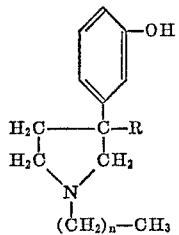

and salts thereof; where R represents an alkyl radical containing from 3 to 5 carbon atoms inclusive; and $n$ represents 4 or 5.

2. A compound according to claim 1 which is m-(3-isobutyl-1-pentyl-3-pyrrolidinyl)phenol.

3. A compound according to claim 1 which is m-(1-pentyl-3-propyl-3-pyrrolidinyl)phenol.

4. A compound according to claim 1 which is m-(3-neo-pentyl-1-pentyl-3-pyrrolidinyl)phenol.

References Cited
FOREIGN PATENTS
743,960  10/1966  Canada _____ 260—326.5 M

JOSEPH A. NARCAVAGE, Primary Examiner

U.S. Cl. X.R.
424—274; 260—326.5 E